(12) United States Patent
Daenen

(10) Patent No.: US 7,448,078 B2
(45) Date of Patent: Nov. 4, 2008

(54) METHOD, A PORTAL SYSTEM, A PORTAL SERVER, A PERSONALIZED ACCESS POLICY SERVER, A FIREWALL AND COMPUTER SOFTWARE PRODUCTS FOR DYNAMICALLY GRANTING AND DENYING NETWORK RESOURCES

(75) Inventor: Koen Regina Eduard Daenen, Haacht (BE)

(73) Assignee: ALCATEL, Paris (FR)

( * ) Notice: Subject to any disclaimer, the term of this patent is extended or adjusted under 35 U.S.C. 154(b) by 846 days.

(21) Appl. No.: 10/458,240

(22) Filed: Jun. 11, 2003

(65) Prior Publication Data

US 2004/0010719 A1    Jan. 15, 2004

(30) Foreign Application Priority Data

Jul. 12, 2002  (EP) .................................. 02360208

(51) Int. Cl.
*G06F 21/00* (2006.01)
(52) U.S. Cl. .............................. 726/12; 709/229; 726/25
(58) Field of Classification Search .................... 726/12, 726/29; 709/203, 219, 224, 229
See application file for complete search history.

(56) References Cited

U.S. PATENT DOCUMENTS

| 6,182,226 | B1 | 1/2001 | Reid et al. | |
| 6,219,706 | B1 * | 4/2001 | Fan et al. ..................... | 709/225 |
| 6,584,505 | B1 * | 6/2003 | Howard et al. ............... | 709/225 |
| 2003/0084345 | A1 * | 5/2003 | Bjornestad et al. .......... | 713/201 |
| 2003/0149888 | A1 * | 8/2003 | Yadav ......................... | 713/200 |

FOREIGN PATENT DOCUMENTS

| EP | 0762707 A2 | 3/1997 |
| WO | WO 9605549 | 2/1996 |
| WO | WO 0131843 A2 | 5/2001 |

* cited by examiner

*Primary Examiner*—Gilberto Barron, Jr.
*Assistant Examiner*—Laurel Lashley
(74) *Attorney, Agent, or Firm*—Sughrue Mion, PLLC

(57) ABSTRACT

The invention relates to an personalized access policy server (pAPS) C1 deriving dynamically granted resources with respect to user's grants and with respect to already accessed resources. It relates to a method for providing dynamically defined limited Internet access to a user's terminal client A1, wherein a portal server C2 provides a portal web site with portal information identifying the set of accessible resources, the terminal client A1 has access to said portal web site; from the portal web site a set of granted resources B3 is dynamically derived with respect to user's grants and with respect to already accessed resources by the personalized access policy server. Further it relates to a portal system, a portal server C2, a personalized access policy server (pAPS) C1, a firewall B2, and corresponding computer software products.

23 Claims, 2 Drawing Sheets

METHOD, A PORTAL SYSTEM, A PORTAL SERVER, A PERSONALIZED ACCESS POLICY SERVER, A FIREWALL AND COMPUTER SOFTWARE PRODUCTS FOR DYNAMICALLY GRANTING AND DENYING NETWORK RESOURCES

BACKGROUND OF THE INVENTION

1. Field of the Invention

The present invention relates to a method and a portal system for personalized dynamically grant just in time Internet resources and deny access for non-granted Internet resources.

Moreover, the present invention relates to a personalized access policy server, a portal server, a firewall, and computer software products for dynamically granting and denying network resources.

The present invention is based on a priority application, EP 02360208.9, which is hereby incorporated by reference.

2. Background

In current environments firewalls and HTTP-proxy servers are able to block fixed sets of resources, e.g. identified by uniform resource identifiers (URIs). The set of URIs that is blocked for a requesting user might dependent on the user's grants or on a user profile as well as security requirements.

Today, as mentioned above, this set of accessible resources is statically configured. Static firewall configurations solve a lot of problems. A well-known example is Internet access in a corporate environment. Employees may access all URIs of the intranet and some URIs of the extra-net without identification. After an authentication to the proxy server the employees can reach the whole Internet.

The origin functionality of a firewall is to create barriers in order to prevent unauthorized access to a network. When thinking of the Internet as a series of hallways, firewalls are the security doors through which some people (i.e. data) may pass and others may not. Hence a firewall is an almost static configurable filter.

From a technical point of view a firewall is a set of related programs, located at a network gateway server, that protects the resources of a private network from users from other networks. The term also implies the security policy that is used with the programs. An enterprise with an intranet that allows its workers access to the wider Internet installs a firewall to prevent outsiders from accessing its own private data resources and for controlling what outside resources its own users have access to.

Basically, a firewall, working closely with a router program, examines each network packet to determine whether to forward it toward its destination. A firewall also includes or works with a proxy server that makes network requests on behalf of workstation users. A firewall is often installed in a specially designated computer separate from the rest of the network so that no incoming request can get directly at private network resources.

There are a number of firewall screening methods. A simple one is to screen requests to make sure they come from acceptable, previously identified domain name and Internet Protocol addresses.

A number of companies make firewall products. Features include logging and reporting, automatic alarms at given thresholds of attack, and a graphical user interface for controlling the firewall.

In the above description, the requestor is located in a private network that has connectivity to the Internet. The owner of the private network however wants to control and/or limit the requests to the Internet. For this purpose the existing solutions fits.

In the business proposition of an Internet service provider (ISP) and a Telephone Corporation (Telco) a more dynamic firewall is advantageous. When a telecom provider offers a service selector portal to an end-user, the end-user has in a first step only access to the Telco's portal. The connection is the Telco's network is established by e.g. a Digital Subscriber Line (DSL). Later on by selecting a service on the portal, the end-user gets access to a corporate network or the Internet via an ISP. The dynamic access can be realized by the virtual routing algorithms and/or IP-filters of an access server, or similar approaches. Note that the role of providing such service selector portal, described in this document as executed by the Telco, can also be executed by an ISP. Other ISPs further in the network are in such case typically named "sub-ISP".

The Telco's portal seems to be the ideal place to publish advertisements, as this forced portal is the entry point for all the end-users as well as for all end-users' further access to any other service in the network. To make the advertisements valuable, it is necessary that the business sites related to the advertisements are reachable for the end-user from the first beginning without an established Internet connection, i.e. with no ISP.

The advertisement business sites are typically located on the public Internet. The Telco however cannot give the end-user full Internet access via his network directly, because by doing this he would become a competitor of its own customer, the ISP.

3. Technical Problem

A URI-blocking function (of a firewall) is necessary where the Telco could restrict the Internet access leaving the added value for the ISP. However, to make the whole advertisement site accessible the restriction to advertisement pages might be too restrictive.

BRIEF DESCRIPTION OF THE INVENTION

The solution for this problem is an improved dynamic configurable firewall filter.

The problem is solved by a personalized Access Policy Server (pAPS). The personalized access policy server dynamically retrieves allowed addresses to be available for a specific end-user and send respective configuration information to a firewall located between the terminal client and the Internet configured individually, just in time.

The invention comprises a method to provide a dynamically defined limited Internet access to a user's terminal client, wherein
- a portal server provides a portal web site with portal information identifying the set of accessible resources,
- the terminal client has access to said portal web site
- from the portal web site a set of granted resources are dynamically derived with respect to user's grants and with respect to already accessed resources by a personalized access policy server,
- Internet resources are accessed via a firewall located between the terminal client and the Internet, and
- the firewall is configured individually, just in time for said user such that only said granted resources are permitted.

The grant or deny might be time dependent and/or dependent on
- already accessed resources,
- the content of the requested resource,
- the resource identifier, resource meta-information, portal information.

An embodiment of the current invention is a portal system to provide a dynamically defined limited Internet access to a user's terminal client comprising a portal server providing a portal web site with portal information identifying the set of to be accessible resources, said terminal client having access to said portal web site, a personalized access policy server, deriving dynamically granted resources with respect to user's grants and with respect to already accessed resources, and a firewall located between the terminal client and the Internet configured individually, just in time for said user such that only said granted resources are permitted.

The portal server provides a portal web site with portal information. It comprises means for identifying the set of to be accessible resources and might be realized by an ordinary web server that is enriched by a personalized access policy server interface.

It is part of the invention that a personalized access policy server derives dynamically granted resources with respect to user's grants and with respect to already accessed resources. It comprises authentication means for authentication and authorization of a user, accounting means for recognizing already accessed resources, and for deriving a set of dynamically granted resources to said user, and granting means for instructing a firewall with respect to the set of dynamically granted resources.

The firewall provides a dynamically defined limited Internet access to a user's terminal client and comprises configuration means for configuring dynamically a current set of granted resources for a terminal client and/or a user, and granting means for individually, just in time permitting access, only to said set of granted resources for said terminal client and/or said user.

Another embodiment of the current invention are computer software products deriving dynamically granted resources with respect to user's grants and with respect to already accessed resources implementing an access policy by authenticating and authorizing a user, recognizing already accessed resources, deriving a set of dynamically granted resources to said user, and instructing a firewall with respect to the set of dynamically granted resources, as well as computer software products providing a portal web site with portal information by identifying the set of to be accessible resources and computer software products providing a dynamically defined limited Internet access to a user's terminal client by configuring dynamically a current set of granted resources for a terminal client and/or a user, and individually, just in time permitting access, only to said set of granted resources for said terminal client and/or said user.

OBJECTS AND ADVANTAGES OF THE INVENTION

Accordingly, it is an object and advantage of the present invention to provide a portal system and a method for a limited Internet access to a user's terminal client, depending on already accessed resources, authentication and authorization of the user, and portal information about the set of to be accessible resources.

Another advantage of the present invention is that it enables a high flexible Internet access and a high flexible Internet restriction to all kind of Internet resources based on variable access policies, user dependent and user behavior dependent.

Yet another advantage of the present invention is that dynamic Internet limitation allow selective site corporation, which facilitate site and service provisioning and allows various business cases.

These and many other objects and advantages of the present invention will become apparent to those of ordinary skill in the art from a consideration of the drawings and ensuing description.

DETAILED DESCRIPTION OF THE INVENTION

Those of ordinary skill in the art will realize that the following description of the present invention is illustrative only and is not intended to be in any way limiting. Other embodiments of the invention will readily suggest themselves to such skilled persons from an examination of the within disclosure.

Figure 1:
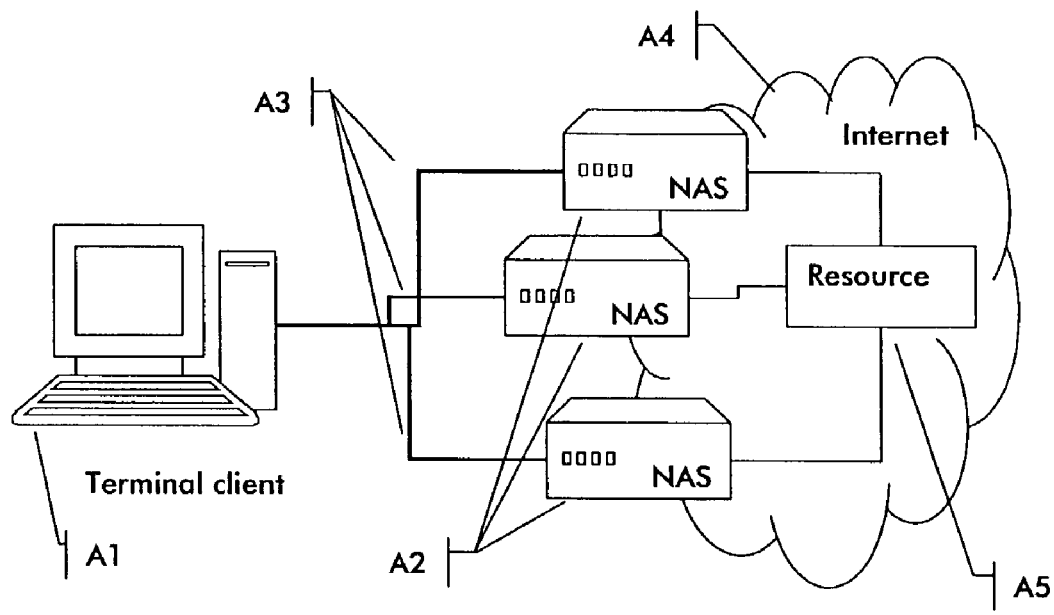
FIG. 1 is a schematic drawing of a prior art access network where a terminal client can connect via a network access server to the Internet.

FIG. 1 shows a terminal client A1, network access servers (NAS) A2 connected via connection A3 to said terminal client A1. The figure further shows the Internet A4 and a Internet resource A5.

The figure shows a prior art access network where a user can access using a terminal client A1 multiple service providers' network access servers using a Telco's connection A3, e.g. DSL. That enables the user to access any Internet resources A5 within the Internet A5.

Figure 2:
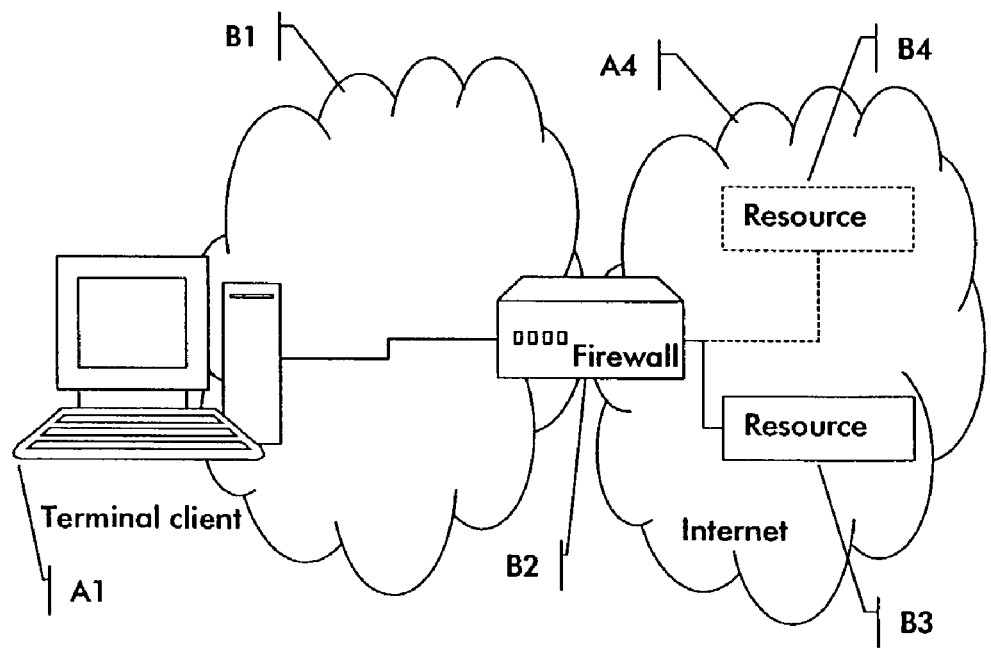
FIG. 2 is a schematic drawing of a prior art where a firewall separates a private network from the Internet.

FIG. 2 shows a terminal client A1 in a private network B1. A firewall B2 separates the private network B1 from the Internet A4. The Internet contains a denied resource B4 and a allowed resource B3.

The figure shows a prior art firewall scenario. It shows the terminal client A1 retrieves via the private network B1, the firewall, and the Internet A4 the allowed Internet resource B3. It is also illustrated that the firewall denies the access to the Internet resource B4.

Figure 3:
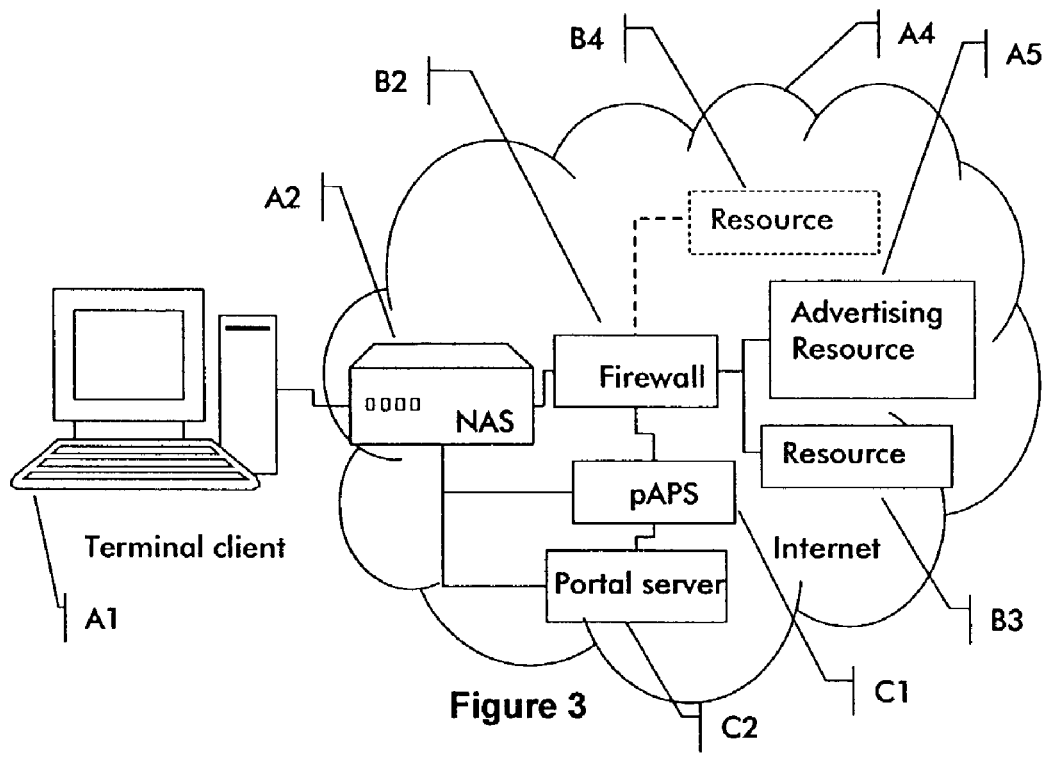
FIG. 3 is a schematic drawing of a network access managed by a personalized access policy server, relating to the invention.

FIG. 3 shows a terminal client A1, a network access server A2, a portal server C2, a personalized access policy server (pAPS) C1, a firewall B2, as well as a (denied) Internet resource B4, a (allowed) Internet resource B3, and an Advertising resource A5 within the Internet A4.

The figure shows how the firewall B2, the personalized access policy server (pAPS) C1, and the portal server C2 act in an access network context. The network access server A2 provides a terminal client A1 restricted access to the Internet A4. The portal server C2 provides a web site as an entry. The user's accounting information from the network access server and the portal information is used by the personalized access policy server to derive a firewall configuration. This firewall configuration depends on the user, the user's behavior, the user's accounting information, and the portal access information dynamically. Hence the personalized access policy server re-configures just in time the firewall B2. The firewall B2 permits access to a set of accessible Internet resources like the Advertising resource A5, and another resource B3, and denies all other resources, like the resource B4.

Consider for instance the above illustrated use case. When a user initiates a network connection by using, e.g. a Telco DSL connection equipment, an advertising web page is shown; made be available by the portal server C2 with a portal web side with advertising URIs to be chosen to establish connections to respective resources in the Internet.

Said URIs of said portal web side are retrieved by the personalized access policy server (pAPS) C1. Respective configuration information is send to the firewall B2 located between the end-user's terminal client A1 and the Internet resources B3, B4, A5, to grant the end-user access to the advertising web sites A5 and B3, only.

The firewall server is configured individually for said end-user client in such a way, that, e.g. only URI request on the visible portal web side are permitted.

Hence, in the scenario, the end-user is connected to a portal server of the Telco. The advertisements on the portal web site are distributed on advertisement web sites located on web servers in the Internet. The personalized access policy server (pAPS) C1, that might be incorporated in the portal server C2, analyses the advertisement information, e.g. the hyperlinks of the portal web site, or more dynamically the URI references on a accessed page, and configures the firewall correspondingly, to give the end-user's client, that has just opened a portal page, access to those resources and its transitive closure, that are associated with advertisements. The portal server C2 might be an ordinary web server enriched by an interface to the personalized access policy server. The configuration protocol used between the personalized access policy server and the firewall needs to be a real-time configuration protocol. This may be proprietary or standardized, e.g. COPS.

In this scenario each user will only be able to access the advertisements, that are shown on his/her personalized portal page. The end-user will only be able to reach the whole Internet when he/she explicitly requests access for that service using an ISP's access equipment; an access request that on his term might be subject of an authentication, authorization and accounting scenario.

Based on the same principle a free-DSL Internet provider could be implemented. Suppose the provider's portal contains several services, that the end-user must access before getting access to some resources, e.g. all sites sponsored by a company. After accessing the advertisement of that company the end-user earns credits to gradually get access to the complete Internet.

Figure 4:
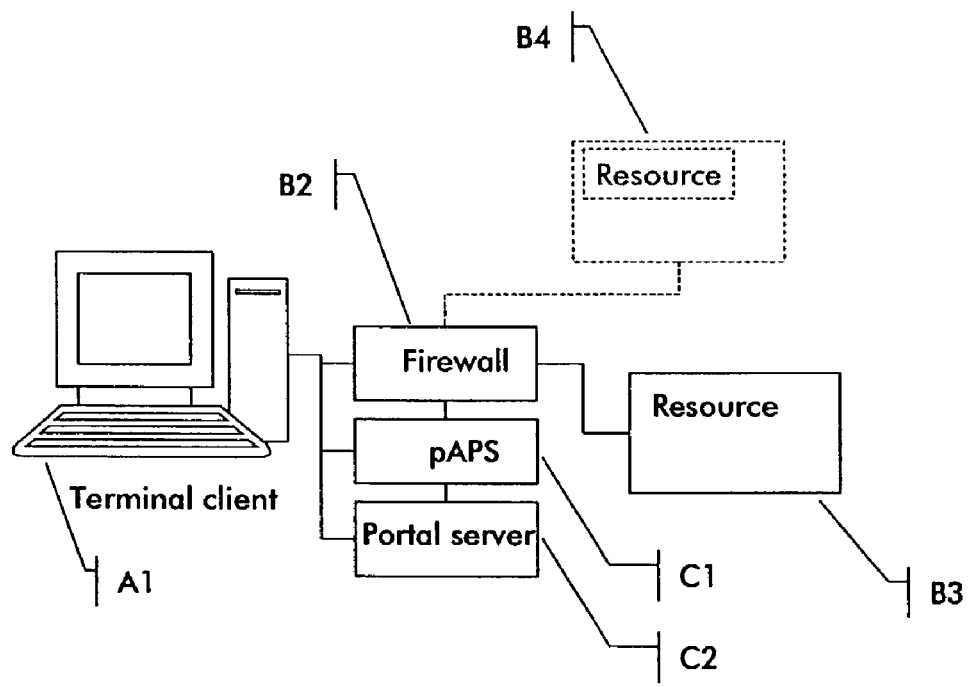
FIG. 4 is a schematic drawing of a network portal system comprising a firewall, a personalized access policy server and a portal server, relating to the invention.

FIG. 4 shows a general network portal system comprising a firewall B2, a personalized access policy server (pAPS) C1, and a portal server C2. A terminal client A1 is connected to a network via the firewall B2. The network provides resources to the terminal client A1 via the firewall B2, where some resources are denied, the inaccessible resources B4, and some resources are allowed, the accessible resources B3. The firewall cannot decide which of the resources is allowed and which should be denied. Therefore the personalized access policy server (pAPS) C1 provides this information to the firewall B2. The personalized access policy server (pAPS) C1 aggregates this information, i.e. the set of accessible resources B3 by the user authenticating-authorizing-and-accounting information and by recognizing already accessed resources and the set of to be granted resources B3.

The set of to be granted resources B3 might be derived from the portal server C2 providing the user an entry point as well as the personalized access policy server (pAPS) C1 a set of to be granted resources B3. This set might grow dynamically by making the referred resources, e.g. specified by the contained hyper link references allowing the user to follow all programmed links. In this case the personalized access policy server grants access to the transitive closure of the portal web site.

Another access policy might be a cooperative granting of associated web sites, or a denying of competitive web sites as well as e.g. a time limited access to the whole Internet managed by earned credits.

Not a business case but a very simple illustrative application of this portal system is to provide parents a tool for limiting Internet access (in a dynamic manner). A child might wish to access a certain web site and the parent could configure the portal to allow following the reference links of this web site (may be limited by 10 references), only. This would forbid the children to access an arbitrary URI by a side entrance, e.g. by writing the URI in the corresponding browser's form.

ALTERNATIVE EMBODIMENTS

Although illustrative presently preferred embodiments and applications of this invention are shown and described herein, many variations and modifications are possible which remain within the concept, scope, and spirit of the invention, and these variations would become clear to those of skill in the art after perusal of this application.

For example, the invention can be used with any type of access network beside the most popular Internet. The invention, therefore, is not intended to be limited except in the spirit of the appended claims.

Another obvious application of the invention might be a multiple portal scenario wherein multiple portal sites are connected to one or more cooperatively working personalized access policy server. This allows the portal owners to provision parts of the Internet by granting a visitor, e.g. surfing on related sites.

Alternatively a cooperative or concurrent environment of personalized (by virtual private network user groups) access policies between virtual private networks managed by the described portal system might be another, more complex, application. Here the dynamic configuration of the firewall might depend on the information flow or the load between the private networks.

Yet another alternative is that the access policy itself might be dynamic, time dependent or user behavior dependent.

What is claimed is:

1. A method of providing a dynamically defined limited Internet access to a terminal client, the method comprising:

causing a portal server to provide a portal web site with portal information identifying a set of accessible resources, wherein the terminal client has access to said portal web site;

causing a personalized access policy server to dynamically derive a set of granted resources from the portal web site with respect to a user's grants and with respect to already accessed resources;

accessing the granted resources via a firewall located between the terminal client and the Internet; and configuring the firewall individually, just in time for said user such that only said granted resources are permitted.

2. The method according to claim 1, wherein grant or denial to the set of granted resources is time-dependent.

3. The method according to claim 1, wherein grant or denial to the set of granted resources is dependent on the already accessed resources.

4. The method according to claim 1, wherein grant or denial to the set of granted resources is dependent on content of a requested resource.

5. The method according to claim 1, wherein grant or denial to the set of granted resources is dependent on a resource identifier.

6. The method according to claim 1, wherein grant or denial to the set of granted resources is dependent on resource meta-information.

7. The method according to claim 1 where, wherein grant or denial to the set of granted resources is dependent on the portal information.

8. A portal system providing a dynamically defined limited Internet access to a terminal client, the portal system comprising:
   a portal server providing a portal web site with portal information identifying a set of accessible resources, said terminal client having access to said portal web site;
   a personalized access policy server deriving dynamically a set of granted resources with respect to a user's grants and with respect to already accessed resources; and
   a firewall located between the terminal client and the Internet configured individually, just in time for said user such that only said granted resources are permitted.

9. A portal server comprising:
   means for providing a portal web site with portal information identifying a set of accessible resources;
   an interface to a personalized access policy server providing and retrieving granting information; and
   an interface to an individually and just in time configured firewall providing granted resources.

10. A portal server according to claim 9, wherein the portal server is realized by a web server that is enriched by the interface to or a module of the personalized access policy server, and the interface to or a module of the firewall.

11. A personalized access policy server comprising:
   means for deriving dynamically granted resources with respect to a user's grants and with respect to already accessed resources;
   authentication means for authentication and authorization of said user;
   accounting means for recognizing the already accessed resources, and for deriving a set of dynamically granted resources to said user; and
   granting means for instructing a firewall with respect to the set of dynamically granted resources.

12. A firewall providing a dynamically defined limited Internet access to a terminal client, said firewall comprising:
   configuration means for configuring dynamically a current set of granted resources for the terminal client or a user; and
   granting means for individually, just in time permitting access, only to said set of granted resources for said terminal client or said user.

13. A computer readable recording medium having recorded thereon a program for executing a method comprising:
   deriving dynamically granted resources with respect to a user's grants and with respect to already accessed resources;
   authenticating and authorizing the user;
   recognizing already accessed resources;
   deriving a set of the dynamically granted resources to said user; and
   instructing a firewall with respect to the set of dynamically granted resources.

14. A computer readable recording medium having recorded thereon a program for executing a method of providing a dynamically defined limited Internet access to a terminal client: the method comprising;
   configuring dynamically a current set of granted resources for the terminal client or a user, and
   individually, just in time permitting access, only to said current set of granted resources for said terminal client or said user.

15. The method according to claim 1, wherein said network resources are uniform resource identifiers.

16. A method of managing network resources passing through a firewall, the method comprising:
   identifying a set of accessible resources;
   deriving a set of granted resources based on access information and the set of accessible resources; and
   dynamically configuring a firewall such that only resources in the set of granted resources are forwarded.

17. The method according to claim 16, wherein the access information comprises a user's grants and already accessed resources.

18. The method according to claim 16, wherein the access information is based on time.

19. The method according to claim 16, wherein the access information is based on content of a requested resource.

20. The method according to claim 16, wherein the access information is based on a resource identifier.

21. The method according to claim 16, wherein the access information is based on resource meta-information.

22. The method according to claim 16, wherein the access information is based on portal information.

23. A portal system to manage network resources passing through a firewall, the portal system comprising:
   a portal website;
   a portal server configured to provide the portal website with access information identifying a set of accessible resources;
   an access policy server configured to dynamically derive a set of granted resources based on said access information on a user basis;
   a firewall individually configurable to forward only requested resources within said set of granted resources.

* * * * *